Dec. 14, 1937.   K. D. KYSOR   2,102,011
THERMOSTATICALLY CONTROLLED MIXING VALVE
Filed Jan. 2, 1935   3 Sheets-Sheet 1

FIG.-I

INVENTOR.
Karl D. Kysor
BY
ATTORNEY.

Dec. 14, 1937.  K. D. KYSOR  2,102,011
THERMOSTATICALLY CONTROLLED MIXING VALVE
Filed Jan. 2, 1935   3 Sheets-Sheet 2

INVENTOR.
Karl D Kysor
BY
ATTORNEY.

Dec. 14, 1937. K. D. KYSOR 2,102,011
THERMOSTATICALLY CONTROLLED MIXING VALVE
Filed Jan. 2, 1935   3 Sheets-Sheet 3
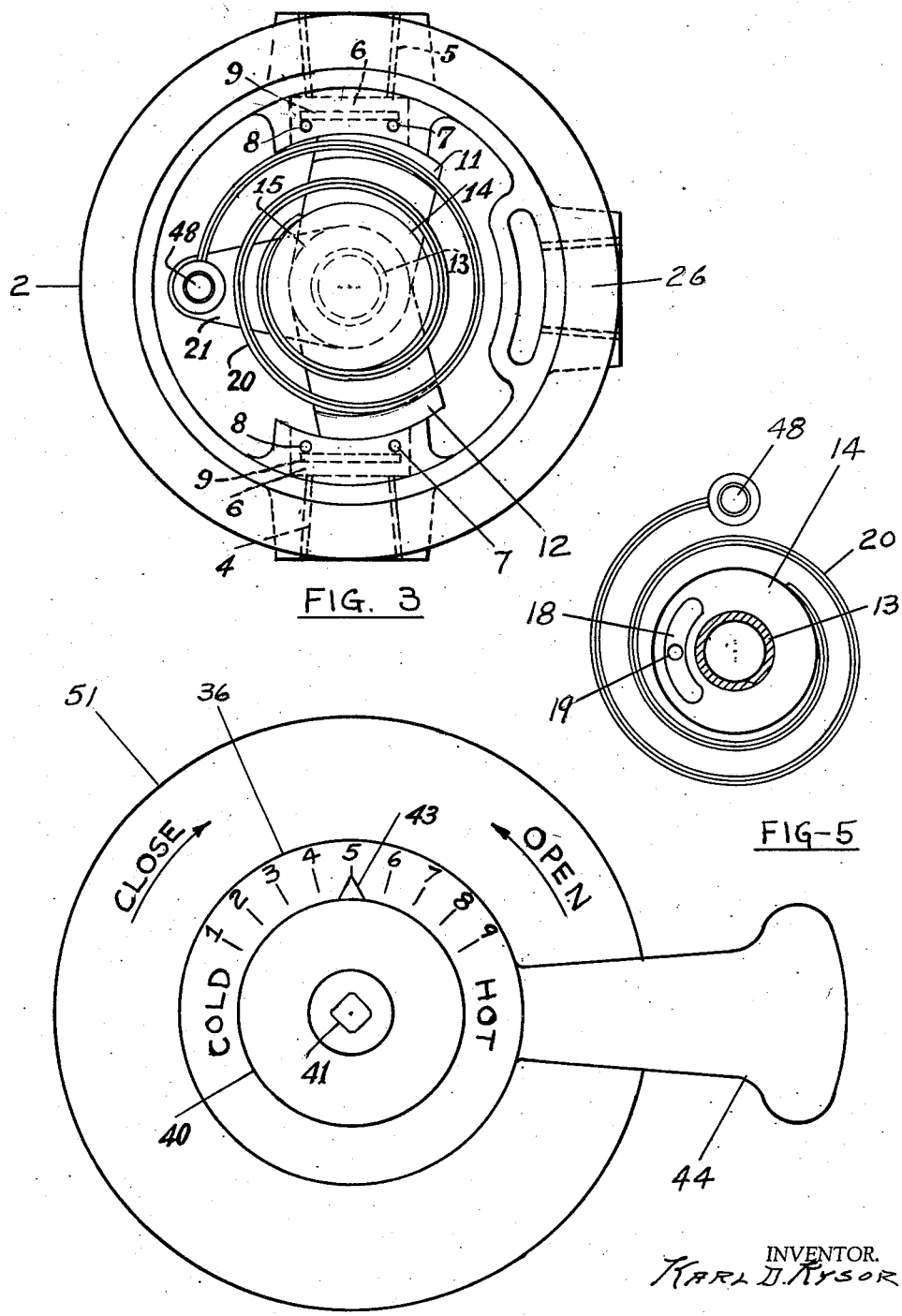
INVENTOR.
KARL D. KYSOR
BY
ATTORNEY.

Patented Dec. 14, 1937

2,102,011

UNITED STATES PATENT OFFICE 2,102,011

THERMOSTATICALLY CONTROLLED MIXING VALVE

Karl D. Kysor, Northville, Mich., assignor of one-tenth to Charles E. Wisner, Detroit, Mich.

Application January 2, 1935, Serial No. 119

10 Claims. (Cl. 236—12)

This invention relates to valves, the object being to provide a valve body connected with a source of supply of both a low and a high temperature fluid and a thermostatically controlled valve controlling the flow of said fluids to discharge from the body at constant temperature.

A further object and feature of the invention is to provide a valve having a body connected with a cold fluid inlet and a warm fluid inlet and a common outlet and means in the valve body between the inlet and the outlet whereby the fluids are thoroughly mixed and a thermostatically controlled valve controlling the flow from the inlet to discharge the fluid at constant temperature.

It is further an object and feature of the invention to provide a valve having the features above mentioned including means for predetermining the temperature at which the fluid may discharge from the valve.

A further object and feature of the invention is to provide a valve having a body adapted for connection with an inlet and an outlet for fluid, a valve having a stem for opening or closing the valve body to flow, said stem being packed against leakage of fluid thereabout and means, when the valve is closed, to relieve the stem packing from pressure of the liquid in the valve body.

Another feature and object of the invention is to provide a valve having a cold and a hot fluid connection, an outlet, a wall between the outlet and the two inlets and passageways in the wall through which the inflowing fluid flows to pass to the outlet, said passageways being constructed to cause an intimate mixing of the fluids from the two inlet sources prior to passing to the outlet and further in conjunction with such last named valve arrangement of a thermostatically controlled means to vary the volume of flow from the cold and the warm inlets to provide for discharge of fluid at a constant temperature from the outlet.

It is also an object and feature of the invention to provide a valve having a body adapted for connection with a source of cold liquid and also for connection with the warm liquid, a rotatable valve member movable to variably open or close the cold inlet in inverse relation and a thermostatic means for controlling the position of the said valve whereby the temperature of the combined fluids from the cold and warm inlet sources may be controlled.

The valve of my invention is adapted for use where a warm and cold liquid are to be mixed and to be discharged at a constant temperature and in the embodiment of the invention shown in the drawings, the valve is particularly adapted for use in shower baths where warm and cold water are to be mixed and discharged at a desired constant temperature.

These and other objects and novel features of construction of a valve embodying my invention are hereinafter more fully described and claimed, and the preferred form of construction of a valve embodying my invention is shown in the accompanying drawings in which—

Fig. 3 is a plan view of the lower part of the body showing the control valve for the hot and cold liquid lines and the thermostatic control device taken on line 3—3 of Fig. 2.

Fig. 4 is a plan view of Fig. 1.

Fig. 5 is a detail in plan view showing the thermostatic element taken from the under side of the same in the position shown in Fig. 1.

Figure 1:
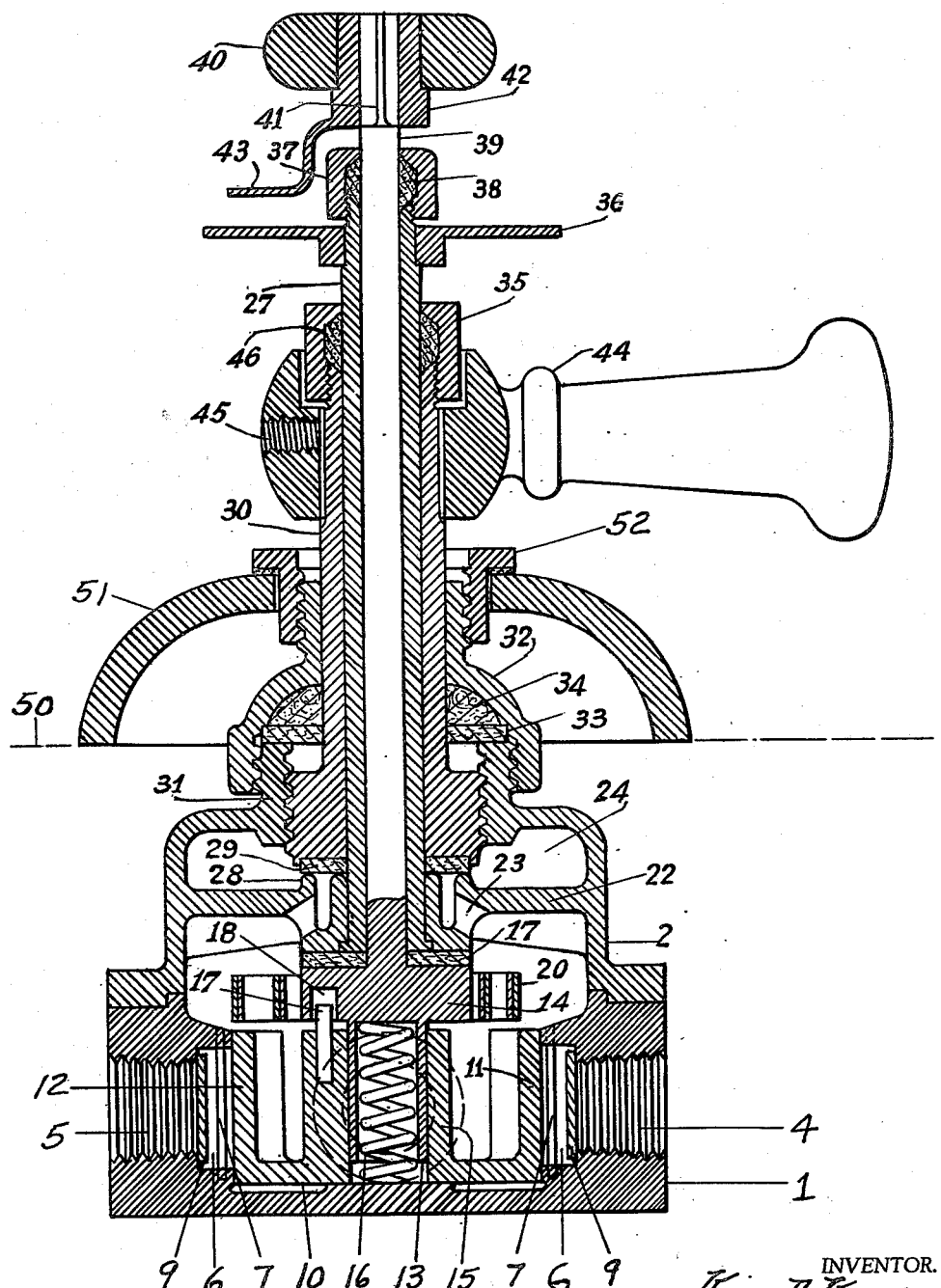
Fig. 1 is a longitudinal section taken through the valve showing the operating parts.

In the embodiment of the invention shown, the valve body is formed of a base portion 1 detachably secured to a chambered portion 2, the parts being connected together as by screws 3. The body portion 1 is provided with a threaded aperture 4 for connection to a hot water conduit and a threaded aperture 5 for a connection with a cold water inlet and this portion 1 of the body is recessed at the inner end of the threaded apertures providing ports as indicated at 6 in each instance.

As shown in Figs. 1 and 3, a pair of pins 7 and 8 in each case extend diametrically across the recesses in a spaced relation one to the other and spaced from the end of the threaded aperture. The pins thus provide a cage for a flat valve plate 9 which, on flow of fluid in either of the inlets, moves inwardly against these pins 7 and 8 and is retained in an upright position thus permitting flow from the hot and the cold water inlet into the body. The valve plates for the respective inlets to the body close the inlet on a reduction of pressure in the respective warm or cold water line, the purpose of which is hereinafter described. The end portions of the recessed parts 6 in each instance are formed on an arc whose center is the axis of the valve 10 which valve has a segmental portion 11 for the inlet 4 and like portion 12 for the inlet 5 seating against the arcuate faces of these recessed parts. This valve member 10 is a floating valve, that is, it is mounted to freely rotate on a hollow stem 13 extending downwardly from the control plate 14, the valve having a hub 15 into which the hollow stem 13 projects. A coiled spring 16 engages against the inner bottom face of the body portion 1 and moves the said plate 14 upwardly against a friction disc 17. The plate 14 has an arcuate slot 18 in its lower face shown in Figs. 1 and 5 and a pin 19 is secured in the hub of the valve 10 and extends into the arcuate slot 18 in the plate 14. Secured to this plate 14 is a spiral coil 20 of thermostatic metal, the inner end thereof being secured to the periphery of the plate 14 as by brazing or otherwise securing the same thereto and the outer end thereof is secured to an arm 21 on the body of the valve member 10.

Figure 2:
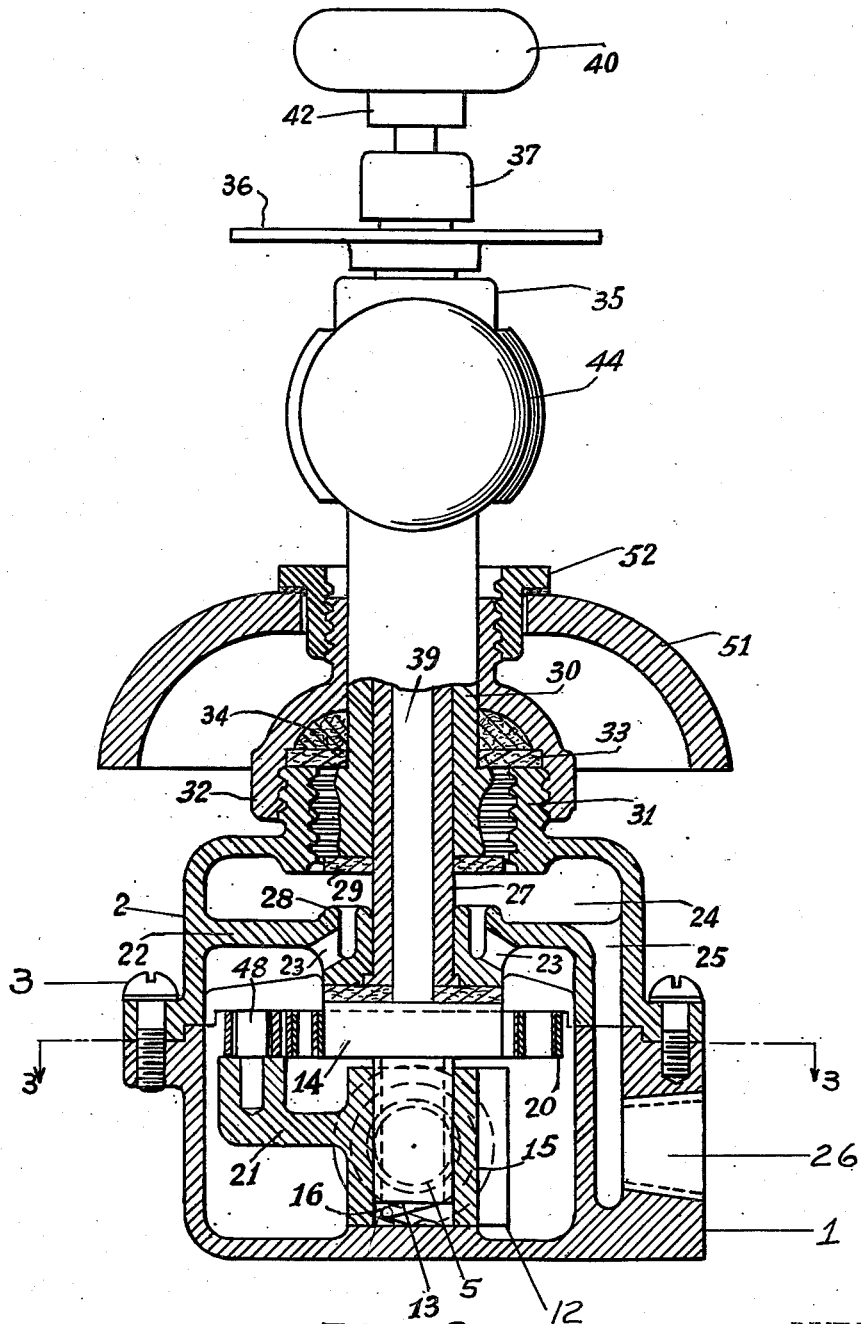
Fig. 2 is a similar section partially in elevation taken at a right angle to the line of the section of Fig. 1.

As the valve member 10 is freely rotatable on the stem 13, variation in temperature of the fluid entering the valve body will expand or contract the thermostatic member thus turning the valve 10 in one direction or the other, and it is to be noted that due to these segmental portions 11 and 12 of the valve being united, movement in one direction will tend to close one of the inlet openings and open the other and to a varying degree depending upon the temperature. To avoid twisting of the thermostatic blade through the turning of the valve, the outer end of the blade has an eye engaging over and freely turnable on a pin 48 attached to the arm 21. These portions 11 and 12 of the valve element 10 are not in diametrically opposite relation but are angularly disposed as will be understood from Fig. 3. The chambered member 2 of the body has a wall 22 formed with a series of apertures 23 leading from the inlet side of the body into the chamber 24 of the outlet side of the body and, as will be seen in Fig. 2, there is a vertical channel 25 open at its upper end to the chamber 24 and at its lower end to an outlet opening 26 with which a discharge conduit may be connected in any approved way. Thus the water from the inlets 4 and 5 must pass through the apertures 23 into the chamber 24 to pass to the outlet and this wall 22 is likewise centrally apertured to receive a tubular member 27. The apertures 23 pass through the wall 22 in a projecting hub like portion 28 which is surfaced to provide a seat for a disc valve 29 secured at one end of the valve stem 30, the lower end of which is enlarged and threaded for engagement with a threaded neck 31 projecting outwardly from the outer or upper wall of the body portion 2.

The neck 31 is also externally threaded to receive a cap 32 which is also constructed to engage a packing disc 33 and it is preferably also cupped to receive other packing 34 so that leakage may be prevented along the stem 30 of the valve. This stem at its upper end is provided with an apertured and threaded cap 35 sealing the interstice between the said stem and the stationary stem 27 secured at its lower end in the wall 22. This stem 27 extends through the packing nut 35 of the valve stem and is shaped at its outer end to receive a dial plate 36 having graduations of any desired form on its upper face as will be understood from Fig. 4. The stem 27 is also threaded to receive a packing nut 37 which compresses the packing 38 against the coned end of the stationary stem 27 to prevent leakage between the stem 27 and the stem 39 attached to the plate 14 or formed integrally therewith as may be found desirable. This stem 39 and consequently the plate 14 may be turned by means of a hand wheel 40 at its outer end which is ribbed or squared as indicated at 41 to receive the metal hub 42 of the wheel. The wheel hub carries a projecting pointer 43 lying in comparatively close relationship with the graduations on the plate 36. It will be noted that, by turning the hand wheel 40 in one direction or the other, the plate 14 will likewise be turned thus placing the thermostatic element 20 under stress tending to turn the valve plate 10 by reason of its connection with the arm 21 of the valve.

The graduations on the dial plate 36 enable the operator to set the valve to secure the desired temperature of the liquid and the slot 18 provides a limit for the throw of the valve 10 in either direction about its axis by the thermostat 20. The plate 14, however, is not free to turn in that it is held by means of the spring 16 against the friction disc 17 mounted on the under face of the hub like portion of the wall 22 and as this resistance to rotation is greater than the resistance of the valve member 10 from rotation, the positioning of the plate 14 by the hand wheel 40 determines the temperature at which the water will flow to the outlet, that is, if the member 40 be turned the plate 14 will be turned with it and if turned to the right in the position of the parts shown in Fig. 3 will tend to increase the opening to the hot water inlet and decrease the opening to the cold water inlet and vice versa.

The stem 30 carrying the fiber or other desirable character of valve plate 29 at its lower end is turnable by means of the handle 44 which may be attached thereto as by means of a set screw 45 and due to the end of the stem being in threaded relation with the tubular projection 31 on the valve body 2, the stem is moved upwardly by rotation of the handle 44 in one direction to open the valve to flow and downward in the other direction to close the valve. When closed this fiber disc or valve plate 29 seals the chamber 24 to fluid under pressure due to its being open to the outlet and the packing for the stems is thus freed from pressure and therefore from liability of leakage when the valve is closed.

The valve shown in the drawings is adapted for use in shower baths in which the body of the valve including the casings or body parts 1 and 2 may be within the wall line of a building indicated at 50 in Fig. 1 for connection with the supply and discharge conduits and the opening in the wall may be covered by the cap 51 which has a central aperture permitting it to be introduced over the valve stems. The bonnet or housing 32 through which the stems extend may be externally threaded to receive an internally threaded retaining nut 52 which retains the cap in place. The valve, however, may be used in various relationships with conduits for any hot and cold liquid which it is desired to be mixed and discharged at a constant temperature. It is particularly desirable in the installations of shower baths that the cold and hot water inlets be provided with means for closing the same on a reduction in pressure in either of the lines discharging through the apertures 4 and 5. This prevents the drawing of water from one of the conduits across the lower part of the valve body to discharge through the other, the means here shown being the loose valve plates 9 for closing the inner discharge ends of the aperture 4 or 5 with which the inlet conduits are connected.

In operation the position of the plate 14 carrying the thermostatic element 20 may be rotatively changed by the handle 40 and the pointer 43 may be set at any given temperature. The turning of the member 40 sets the valve 10 to increase or decrease the flow in the hot water line and to correspondingly decrease, or increase the flow from the cold water line and if for this setting of the valve the temperature runs too hot the thermostatic element 20 will open the cold water line to increase the opening in the cold water line and the reverse action resulting in the event the water tends to discharge at too low a temperature. Thus by merely setting the valve to discharge at a certain temperature the handle 44 may be turned to raise the valve plate 29 from its seat which will permit water to flow through the passages 23 and commingle in the chamber 24 and pass to the outlet.

For the purpose of thoroughly mixing the fluid from the two inlets 4 and 5 the channels 24 through the wall 22 of the body section 2 may be disposed at an angle spirally of the axis of the stem so that t. : liquid discharges into the chamber 24 in whirling streams and thus is thoroughly mixed prior to passing to the outlet.

It will be observed from the foregoing that the major features of the invention are involved in the provision of a comparatively freely rotatable valve 10 for controlling the inlets, a thermostat for positioning the valve to vary the extent of opening of the inlets, a stem for manually positioning the valve in respect to the inlets, a thermostat for automatically varying the position of the valve depending upon variation in temperature of the inflowing fluids and a means for closing the valve to flow. The valve 10 of necessity must be comparatively freely rotatable in order that the thermostat may actuate the same readily and thus there is some leakage through the two inlet ports as the valve 10 cannot be so tightly closed as to prevent leakage and still be actuated by the thermostat. For this reason, and also for the reason heretofore mentioned of relieving the stem packings of pressure when the valve is closed, the valve 29 is provided which, through operation of the handle 44, may open or close the passageway between the inlet and outlet chambers.

While I have described the invention in its preferred form, it is to be understood that various changes may be made therein without departing from the spirit and scope of the invention set forth in the appended claims.

Having thus briefly described my invention, its utility and mode of operation, what I claim and desire to secure by Letters Patent of the United States is—

1. In a valve of the character described, a body having an inlet chamber arranged for inflow of fluids of different temperatures, an outlet chamber to which the mixed fluids discharge from the inlet chamber, the two chambers being in parallel relationship separated by a common wall having a centrally disposed passageway providing for flow from the inlet to the outlet chamber, a rotatable valve for closing the passageway to the outlet chamber, a second rotatable valve in the inlet chamber for varying the volume of inflow of the fluids in inverse relation, a thermostatic element in the inlet chamber attached to and adapted to position the second valve about its axis of rotation to maintain the temperature of the fluid discharged to the outlet chamber substantially constant, a revoluble element in the inlet chamber to which the thermostat is also attached whereby its position rotatively of the chamber is determined, said revoluble element being adjustably fixed in position about its axis, and means between the second valve and the said revoluble element limiting the extent of movement of the valve in either direction by the thermostatic element.

2. In a valve of the character described, a body having an inlet chamber arranged for inflow of fluids of different temperatures, an outlet chamber to which the mixed fluids discharge from the inlet chamber, a wall separating the chambers and having an opening for a flow of fluid from the inlet to the outlet chamber, a rotatable valve in the inlet chamber for varying the volume of inflow of the fluids in inverse relation, a thermostatic element in the inlet chamber attached to and adapted to position the valve about its axis of rotation to maintain the temperature of the fluid discharged to the outlet chamber substantially constant, a revoluble element in the inlet chamber to which the thermostat is also attached whereby its position rotatively of the chamber is determined, said revoluble element being adjustably fixed in position about its axis, means between the valve and the said revoluble element limiting the extent of movement of the valve in either direction by the thermostatic element, a second valve movable to close the outlet end of the passageway from the inlet to the outlet chambers and a friction device for holding the revoluble element from movement through action of the thermostat in turning the rotatable valve.

3. In a valve of the character described, a body having an inlet chamber, a port on one side thereof for connection with a conduit for fluid of certain temperature, a diametrically opposite port for connection with a conduit for fluid of a different temperature, an outlet chamber having an opening connected with a conduit for discharge of the mixed fluids, a wall between the chambers having a series of apertures and a cylindrical passageway opening to the outlet chamber providing for a flow of fluids from the inlet to the outlet chamber, said apertures being inclined to the axis of the valve whereby fluid is discharged into the cylindrical passageway in a series of streams at an angle one to the other to thereby cause an intimate mixture of fluids entering the outlet chamber, a thermostatically controlled valve in the inlet chamber for opening and closing the inlet ports to a flow of fluid in inverse relation and actuated by the temperature of the inflowing fluids to position the valve to maintain the discharged fluid at constant temperature, a valve for closing the discharge end of the cylindrical passageway, and means operable from the exterior of the valve body to initially set the thermostatically controlled valve at certain positions relative to the said inlets.

4. In a valve of the character described, a body having an inlet chamber, a port on one side thereof for connection with a conduit for fluid of certain temperature, a diametrically opposite port for connection with a conduit for fluid of a different temperature, an outlet chamber having an opening connected with a conduit for discharge of the mixed fluids, a wall between the chambers having a series of apertures and a cylindrical passageway to which the apertures discharge, said passageway opening to the outlet chamber providing for a flow of fluids from the inlet to the outlet chamber, said apertures being inclined to the axis of the valve whereby fluid is discharged into the cylindrical passageway in a series of streams at an angle one to the other to thereby cause an intimate mixture of fluids entering the outlet chamber, a thermostatically controlled valve in the inlet chamber for opening and closing the inlet ports to a flow of fluid in inverse relation and actuated by the temperature of the inflowing fluids to position the valve to maintain the discharged fluid at constant temperature, means operable from the exterior of the valve body to initially set the valve at certain positions relative to the said inlets, and a valve means for opening or closing the discharge end of said cylindrical passageway.

5. A valve of the character described, a body having an inlet chamber arranged for inflow of fluids of different temperatures, an outlet chamber, a wall separating the chambers and having a series of apertures and a passageway to which the apertures open providing for a flow of fluid from the inlet to the outlet chamber, said apertures being inclined in respect to the axis of the chamber whereby the fluid is passed into the passageway in angularly disposed streams whereby the fluid from the several inlets is thoroughly mixed, the outlet chamber having an aperture to which the fluids flow subsequent to mixture in the chamber, a valve means operable from the exterior of the body for opening or closing the said passageway in the separating wall, and a thermostatically controlled valve for the inlets operable through expansion or contraction to vary the volume of inflow of the respective fluids.

6. In a valve of the character described, a body having an inlet chamber and an outlet chamber thereabove, a wall separating the same having an aperture providing for communication therebetween, the intake chamber having a pair of oppositely disposed ports for connecting respectively with a hot and cold liquid conduit, a balanced valve having portions for respectively controlling the ports, a thermostatic element located in the upper portion of the intake chamber for rotatively positioning the valve portions in respect to the said ports whereby the volume of flow through the ports may be varied, the construction of the chamber and valve and location of the ports being such as to cause the inflowing luid from the said ports to impinge one upon the other at one side of the lower portion of the intake chamber thereby mixing the fluids, the mixed fluids then flowing upwardly across the thermostatic element to the outlet chamber.

7. In a valve of the character described, a body having an inlet chamber and an outlet chamber thereabove, the inlet chamber having a port on one side for inflowing warm fluid and a port spaced therefrom for inflowing cold fluid, a rotatable valve for controlling the ports to inversely vary the volume of flow therethrough, a thermostat for positioning the valve to provide for a predetermined volume of flow from the respective ports, the ports and valve being so arranged as to cause the liquids to impinge one upon the other in the inlet chamber, a wall separating the inlet and outlet chambers and having a passageway on the common vertical axis of the chambers providing for communication therebetween, said passageway having apertures angularly disposed in respect to the vertical axis of the passageway to produce a tangential flow of fluids in discharging to the outlet chamber, a shut-off valve in the outlet chamber for opening or closing the said passageway and having a face at a right angle to the axis of the passageway against which the tangentially flowing fluid impinges when the valve is open thereby radially spreading the fluid in the outlet chamber forming a torus in flow lines causing still further intimate mixing of the fluids prior to discharge from the outlet chamber, and an outlet conduit connected with the said outlet chamber.

8. In a valve of the character described, a body having an inlet chamber and an outlet chamber thereabove, the inlet chamber having a port for inflow of warm fluids and a circumferentially spaced port for inflow of cold fluids, a rotatable valve for controlling the flow of fluids through the said ports, a thermostat connected with the valve and functioning to vary the rotative position of the valve through influence of temperature of the mixed fluids, a wall separating the chambers having a central passageway providing for communication therebetween, said passageway having a series of apertures opening thereto inclined in respect to the axis of the passageway and tangential thereto whereby the flow of fluids is in angularly disposed streams causing rotation of the fluid in the passageway producing a helix in the flow lines of the liquid passing therethrough, and a shutoff valve for the passageway positioned in the outlet chamber against which the liquid discharging from the passageway impinges and is caused to spread in the outlet chamber, said chamber having an outlet for discharge of fluid therefrom.

9. In a valve of the character described, a body having a circular inlet chamber and a circular outlet chamber positioned thereabove, a wall separating the chambers, an annular passageway in the said wall, said passageway and chambers having a common vertical axis, the inlet chamber having a port for connection with a hot liquid conduit and a port circumferentially spaced therefrom for connection with a cold liquid conduit, a rotative valve in the inlet chamber for controlling the ports, a thermostatic element for positioning the valve to inversely vary the volume of flow of fluid into the inlet chamber from the respective ports, to provide for certain temperature of the mixed fluids, said annular passageway having apertures opening to the inlet chamber inclined to the axis of the passageway whereby the stream discharged through the passageway is caused to rotate, a shutoff valve in the outlet chamber having a face at a right angle to the passageway against which the rotating fluid body impinges and is caused to spread in the outlet chamber, and an outlet conduit extending downwardly from the edge of the outlet chamber at a sharp angle to the plane thereof to discharge the liquid with a minimum disturbance to the torus of the flow lines in the outlet chamber.

10. In a valve of the characer described, a body having an inlet chamber and an outlet chamber thereabove in communication therewith, the inlet chamber having an inlet port for cold fluids and an oppositely disposed inlet port for warm fluids in circumferentially spaced relation, a rotatable valve having face portions for controlling the said hot and cold inlet ports, a thermostatic element connected with the valve and positioning the same to vary the volume of flow of fluids per unit of time through the said inlet ports to provide a body of fluid passing to the outlet chamber of a practically constant predetermined temperature, the valve having a central bearing materially less in radius than the radius of the said face portions whereby friction restricting rotation of the valve is reduced to a minimum and the responsiveness of the valve to influence of the thermostat thereby increased.

KARL D. KYSOR.